United States Patent
Mazzoni et al.

(10) Patent No.: US 12,516,710 B2
(45) Date of Patent: Jan. 6, 2026

(54) DISC BRAKE WITH FLOATING CALIPER AND OPERATING METHOD FOR A DISC BRAKE WITH FLOATING CALIPER

(71) Applicant: BREMBO S.p.A., Curno (IT)

(72) Inventors: Matteo Mazzoni, Curno (IT);
Alessandro Rossi, Curno (IT);
Beniamin Szewczyk, Curno (IT);
Andrea Milanesi, Curno (IT)

(73) Assignee: Brembo S.p.A., Bergamo (IT)

( * ) Notice: Subject to any disclaimer, the term of this patent is extended or adjusted under 35 U.S.C. 154(b) by 395 days.

(21) Appl. No.: 18/267,825

(22) PCT Filed: Dec. 9, 2021

(86) PCT No.: PCT/IB2021/061496
§ 371 (c)(1),
(2) Date: Jun. 16, 2023

(87) PCT Pub. No.: WO2022/130134
PCT Pub. Date: Jun. 23, 2022

(65) Prior Publication Data
US 2024/0052900 A1 Feb. 15, 2024

(30) Foreign Application Priority Data
Dec. 16, 2020 (IT) .......................... 102020000030986

(51) Int. Cl.
*F16D 55/226* (2006.01)
*F16D 65/18* (2006.01)
(Continued)

(52) U.S. Cl.
CPC .......... *F16D 65/183* (2013.01); *F16D 55/226* (2013.01); *F16D 2055/0029* (2013.01); *F16D 2121/24* (2013.01); *F16D 2125/40* (2013.01)

(58) Field of Classification Search
CPC ....... F16D 2055/009; F16D 2055/0066; F16D 55/226; F16D 55/2265; F16D 65/0971; F16D 65/183; F16D 2127/02
See application file for complete search history.

(56) References Cited

U.S. PATENT DOCUMENTS

| | | | |
|---|---|---|---|
| 2016/0137181 A1* | 5/2016 | Shim | B60T 13/686 303/15 |
| 2018/0106317 A1* | 4/2018 | Fricke | F16D 55/226 |

(Continued)

FOREIGN PATENT DOCUMENTS

EP    2551546 A1    1/2013

OTHER PUBLICATIONS

European Patent Office Report, issued in PCT/IB2021/061496, Jun. 1, 2022, Rijswijk, NL.

*Primary Examiner* — Bradley T King
(74) *Attorney, Agent, or Firm* — Marshall & Melhorn, LLC

(57) ABSTRACT

A floating disc brake has a supporting bracket, a caliper body connected to the supporting bracket, a first friction pad on a first side of the caliper body, a second friction pad on a second side of the caliper body, fixed to the caliper body, a first piston connected to the first friction pad and a second piston that can freely rest on the first friction pad forming a positioning surface which can abut against a resting surface of the supporting bracket. The first and second pistons can be actuated independently so that a rearward movement of the first piston towards the first side detaches the first friction pad from the brake disc, and a rearward movement of the second piston towards the first side, with the positioning surface abutting against the resting surface moves the caliper body together with the second friction pad towards the second side and detaches the second friction pad from the brake disc.

12 Claims, 5 Drawing Sheets

(51) Int. Cl.
*F16D 55/00* (2006.01)
*F16D 121/24* (2012.01)
*F16D 125/40* (2012.01)

(56) References Cited

U.S. PATENT DOCUMENTS

| | | | |
|---|---|---|---|
| 2019/0085926 A1* | 3/2019 | Siegrist | F16D 65/54 |
| 2020/0386286 A1* | 12/2020 | Pierangelo | F16D 65/0075 |
| 2021/0215215 A1* | 7/2021 | Kim | F16D 55/226 |
| 2022/0010852 A1* | 1/2022 | Bourlon | F16D 55/2262 |
| 2022/0074456 A1* | 3/2022 | Svensson | F16D 65/0979 |
| 2022/0299072 A1* | 9/2022 | Thomas | F16D 55/227 |
| 2022/0325765 A1* | 10/2022 | Chung | F16D 65/66 |
| 2023/0349431 A1* | 11/2023 | Wang | F16D 65/18 |
| 2024/0141960 A1* | 5/2024 | D'Alessio | F16D 65/0971 |
| 2025/0027548 A1* | 1/2025 | Church | F16D 65/0068 |
| 2025/0075758 A1* | 3/2025 | Koduri | F16D 65/095 |
| 2025/0146547 A1* | 5/2025 | Huber | F16D 65/0056 |

* cited by examiner

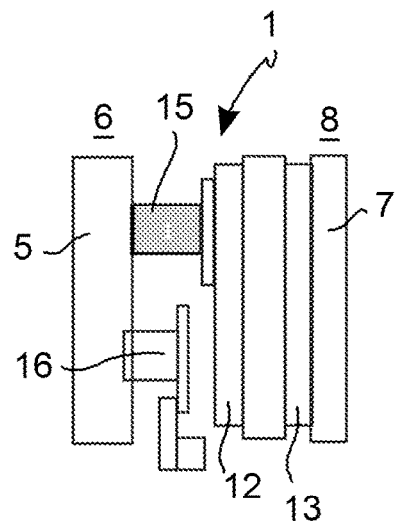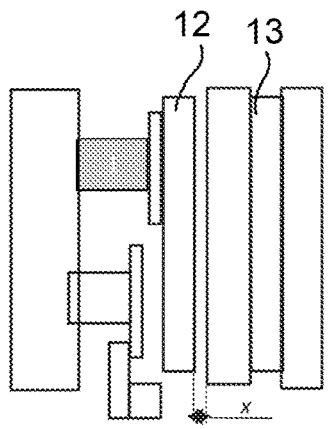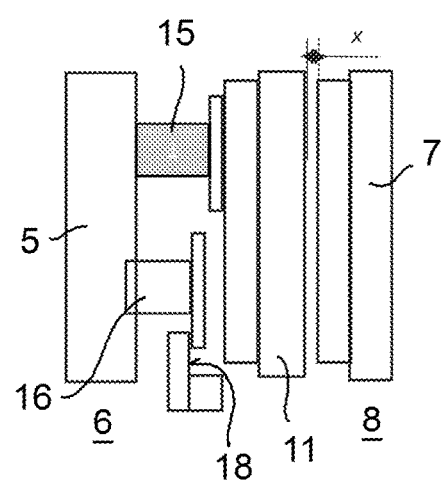
FIG. 11A   FIG. 11B   FIG. 11C
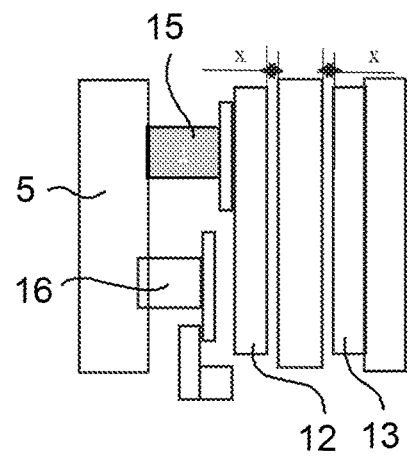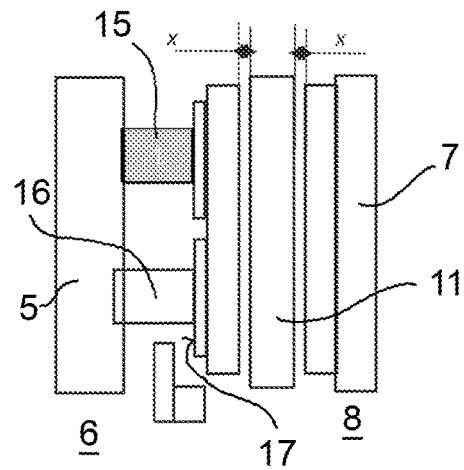
FIG. 11D   FIG. 11E

DISC BRAKE WITH FLOATING CALIPER AND OPERATING METHOD FOR A DISC BRAKE WITH FLOATING CALIPER

FIELD OF THE INVENTION

The present invention relates to a disc brake with a floating caliper and an operating method for the disc brake with a floating caliper, particularly for motor vehicles or, alternatively, for industrial applications in rotary machines.

More in particular, the invention relates to a novel strategy for controlling the position of the floating caliper relative to the brake disc to reduce and/or cancel the residual torque or drag torque, and for implementing the novel control strategy in a floating caliper with electromechanical actuation.

BACKGROUND ART

Floating caliper disc brakes comprise a supporting bracket connectable to the suspension of the vehicle, a caliper body mounted in a sliding manner to the supporting bracket and forming a first wall arranged on a first side (actuation side) of a brake disc and a second wall arranged on a second side (reaction side) of the brake disc opposite to the first side, one or more first and second friction pads supported by the supporting bracket and/or the caliper body on the first and second sides of the brake disc, respectively, and one or more actuating pistons supported by the caliper body on the first side of the brake disc only and operable to bias the first friction pads towards the second side against the brake disc.

In this manner, the thrust on one side of the first friction pads against the brake disc generates a reaction force which makes the caliper body slide relative to the supporting bracket in the direction opposite to the direction of the thrust on one side, i.e. towards the first side of the brake disc, so that the second wall of the caliper body biases the second pads against the brake disc, thus achieving alignment of the pads opposite to the brake disc and a clamping of the brake disc on both sides.

In a floating caliper, at the end of a service braking event, the second pad on the reaction side always remains in contact with the disc, generating residual drag torque even when the brake pedal is released and no braking torque is required.

Therefore, the need is felt to center the floating caliper relative to the brake disc to guarantee a complete detachment of the pads from the brake disc and cancel the residual drag torque.

However, to date, only the position of the first pad on the piston side can be controlled to a given extent by the configuration and positioning of the elastic seal and its housing in the caliper body, which positions the (unbiased) piston elastically relative to the caliper (roll-back effect). The second pad on the reaction side is mounted to the floating caliper without any possibility of actively biasing its position and, therefore, its detachment from the brake disc when the brake pedal is released and no braking torque is required.

SUMMARY OF THE INVENTION

Therefore, it is the object of the invention to make available a method for operating a floating caliper disc brake having characteristics such as to position the caliper relative to the brake disc actively, creating a separation on both sides between the brake disc and pads, to achieve zero residual drag torque.

This object is achieved by means of a floating caliper disc brake, comprising:
 a supporting bracket which can be connected to a vehicle suspension,
 a caliper body connected in a sliding manner to the supporting bracket in a sliding direction and forming a first wall arranged on a first side of the caliper body and a second wall arranged on a second side of the caliper body opposite to the first side in the sliding direction, the first and second walls mutually delimiting a disc space for accommodating a portion of a braking band of a brake disc,
 a first friction pad supported (by the supporting bracket or the first wall of the caliper body) in the disc space on the first side of the caliper body in a sliding manner relative to the caliper body,
 a second friction pad supported (by the supporting bracket or the second wall of the caliper body) in the disc space on the second side of the caliper body and fixed to the second wall of the caliper body,
 a plurality of actuating pistons supported on one side in the first wall of the caliper body which can be actuated to push the first friction pad, in an actuating direction parallel to the sliding direction, towards the second side against the brake disc braking band portion, causing the first friction pad to move towards the second friction pad and a sliding of the brake caliper body relative to achieve a pressing contact on both sides of the brake disc between the first and second friction pads,
characterized in that:
 the plurality of actuating pistons comprises at least one or more of a first piston connected to the first friction pad integral in translation in the actuating direction, and at least one or more of a second piston associated with the first pad in a freely resting and detachable manner in the actuating direction,
 the second piston forms a positioning surface which can abut, in the sliding direction towards the first side, against a corresponding resting surface integral in translation in the sliding direction either with the supporting bracket or with the first piston,
 the first piston and the second piston can be actuated selectively and independently of each other,
so that:
 a rearward movement of the first piston towards the first side detaches the first pad from the brake disc, and
 a rearward movement of the second piston towards the first side, with the positioning surface abutting against the resting surface displaces the caliper body together with the second pad towards the second side and detaches the second pad from the brake disc.

In this manner, at the end of each braking event, it is possible to move the first piston and the second piston with a defined sequence to position the caliper body and the pads in the correct position relative to the brake disc and, therefore, avoid contacts which generate undesired residual drag torques.

This reduces pad wear, energy consumption, pollutant emissions, and increases vehicle range while ensuring brake performance.

According to a further aspect of the invention, the object of the invention is achieved by a method for operating a disc brake with a floating caliper comprising:
 a supporting bracket which can be connected to a vehicle suspension,
 a caliper body connected in a sliding manner to the supporting bracket in a sliding direction and forming a first wall arranged on a first side of the caliper body and a second wall arranged on a second side of the caliper body opposite to the first side in the sliding direction, the first and second walls mutually delimiting a disc space for accommodating a portion of a braking band of a brake disc, a first friction pad supported (by the supporting bracket or the first wall of the caliper body) in the disc space on the first side of the caliper body in a sliding manner relative to the caliper body, a second friction pad supported (by the supporting bracket or the second wall of the caliper body) in the disc space on the second side of the caliper body and fixed to the second wall of the caliper body, a plurality of actuating pistons supported on one side in the first wall of the caliper body which can be actuated to push the first friction pad, in an actuating direction parallel to the sliding direction, towards the second side against the brake disc braking band portion, causing the first friction pad to move towards the second friction pad and a sliding of the brake caliper body relative to achieve a pressing contact on both sides of the brake disc between the first and second friction pads, wherein:

the plurality of actuating pistons comprises a first piston connected to the first friction pad integral in translation in the actuating direction and a second piston associated with the first friction pad in a freely resting and detachable manner along the actuating direction, the second piston forms a positioning surface which can abut, in the sliding direction towards the first side, against a corresponding resting surface integral in translation in the sliding direction either with the supporting bracket or with the first piston, characterized by the steps of:

actuating the first piston and the second piston selectively and independently of each other, after a service braking event, detaching the first pad from the brake disc by means of a rearward movement of the first piston towards the first side, and a first friction pad detached from the brake disc, moving the caliper body together with the second pad towards the second side and detaching the second pad from the brake disc, performing a rearward movement of the second piston towards the first side, with the positioning surface abutting against the resting surface.

BRIEF DESCRIPTION OF THE DRAWINGS

To understand the invention and better appreciate its advantages, the description of non-limiting embodiments will be provided below with reference to the figures, in which.

DETAILED DESCRIPTION

Disc Brake 1

Figure 1:
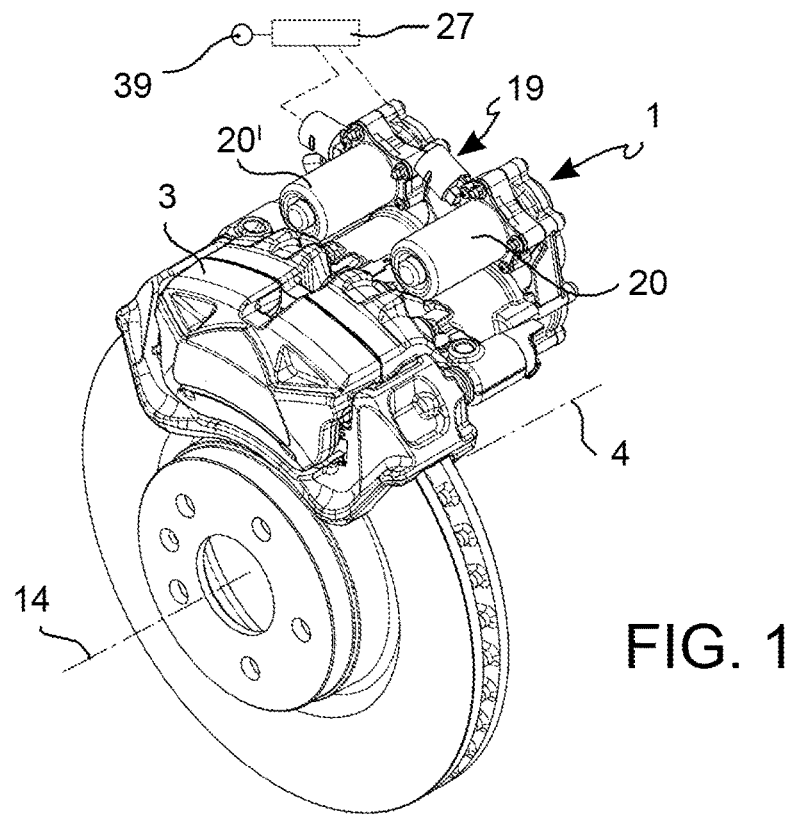
FIG. 1 is a perspective view of a disc brake with a floating caliper according to an embodiment of the invention.
Figure 2:
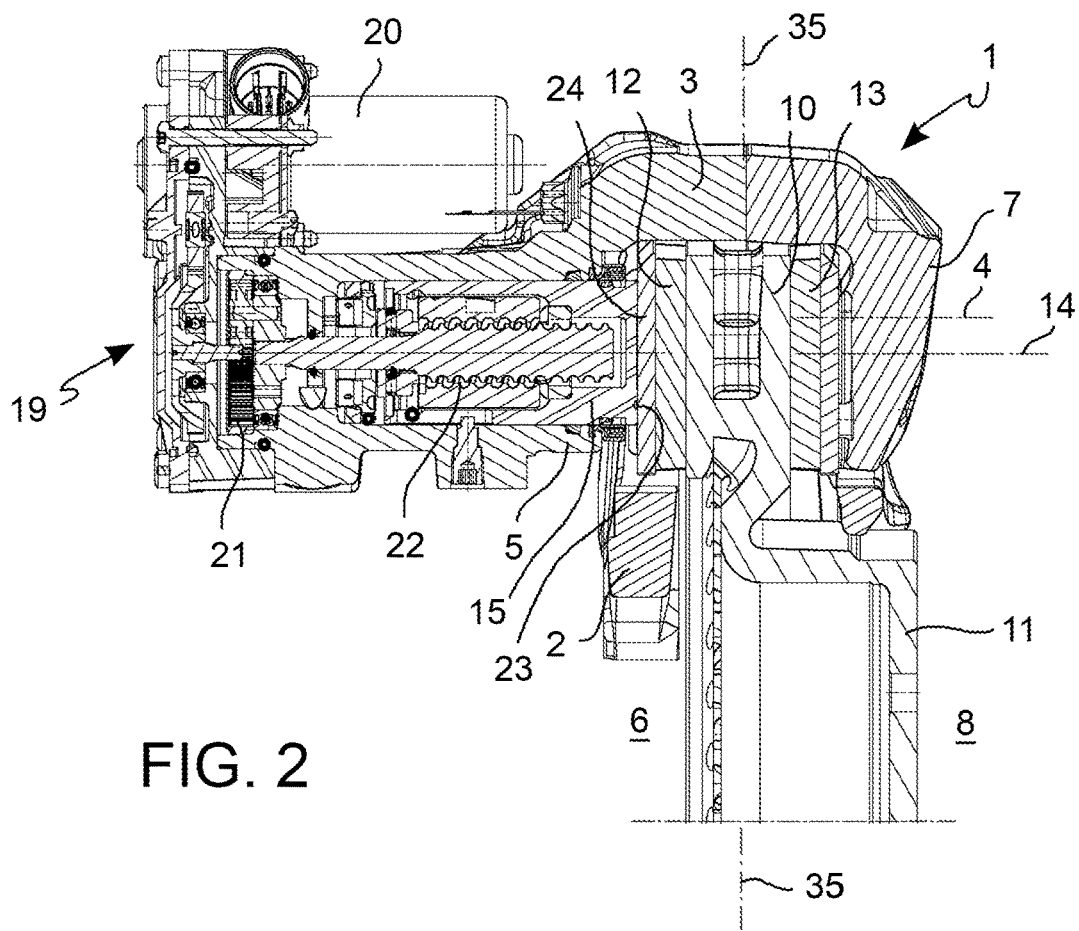
FIG. 2 is a section view of the disc brake in FIG. 1.

With reference to the figures, a disc brake 1 of the floating caliper type comprises a supporting bracket 2 connectable, for example, by screws or bolts, to the suspension of the vehicle, a caliper body 3 connected in a sliding manner to the supporting bracket 2 in a sliding direction 4 and forming a first wall 5 arranged on a first side 6 (inner vehicle side) of the caliper body 3 and a second wall 7 arranged on a second side 8 (outer vehicle side) of the caliper body 3 opposite to the first side 6 in the sliding direction 4, the first 5 and second 7 walls mutually delimiting a disc space 9 for accommodating a portion of the braking band 10 of a brake disc 11, a first friction pad 12 supported (by the supporting bracket 2 or the first wall 5 of the caliper body 3) in the disc space 9 on the first side 6 of the caliper body 3, in a sliding manner relative to the caliper body 3, a second friction pad 13 supported (by the supporting bracket 2 or the second wall 7 of the caliper body 3) in the disc space 9 on the second side 8 of the caliper body 3, and fixed to the second wall 7 of the caliper body 3, a plurality of actuating pistons supported on one side in the first wall 5 of the caliper body 3 which can be operated to push the first friction pad 12, in an actuating direction 14 parallel to the sliding direction 4, towards the second side 8 against the braking band portion 10 of the brake disc 11, causing the first friction pad 12 to move towards the second friction pad 13 and a sliding of the brake caliper body 3 relative to the supporting bracket 2 until the brake disc 11 is tightened on both sides between the first and second friction pads 12, 13.

The plurality of actuating pistons comprises a first piston 15 connected to the first friction pad 12 integral in translation in the actuation direction 14 and a second piston 16 associated with the first friction pad 12 in a manner which is freely resting (against the first pad 12) and detachable (from the first pad 12) along the actuating direction 14.

The second piston 16 forms a positioning surface 17 which can abut, in the sliding direction 4 towards the first side 6, against a corresponding resting surface 18, 18' which is either fixed or integral in translation in the direction of travel 4, either with the supporting bracket 2 or with the first piston 15. In other words, by retracting, the second piston 16 may abut against a fixed reference point (the resting surface 18) formed at the fixed supporting bracket 4 or, alternatively, by retracting, the second piston 16 may abut against a "relative" reference point (the resting surface 18') formed at the first piston 15.

The first piston 15 and the second piston 16 can be actuated selectively and independently of each other so that:

a rearward movement of the first piston 15 towards the first side 6 detaches the first pad 12 from the brake disc 11, and a rearward movement of the second piston 16 towards the first side 6, with the positioning surface 17 abutting against the resting surface 18, 18' moves the caliper body 3 together with the second pad 13 towards the second side 8 and detaches the second pad 13 from the brake disc 11.

In this manner, at the end of each braking event, it is possible to move the first piston 15 and the second piston 16 with a defined sequence to position the caliper body 3 and the friction pads 12, 13 in a planned position relative to the brake disc 11 and, therefore, avoid contacts that generate undesired residual drag torques.

This reduces pad wear, energy consumption, pollutant emissions, and increases vehicle range while ensuring brake performance.

The actuating pistons 15, 16 may be actuated by means of a hydraulic actuating system or by means of an electromechanical actuating system 19, e.g., comprising for each piston 15, 16 a dedicated electric motor 20, 20' and an actuating mechanism 21, e.g., a gear, and a conversion mechanism 22, e.g., a screw and nut assembly, which converts the rotational motion of the actuating mechanism 21 into a translatory motion of the piston 15, 16.

The actuating system, e.g., either electromechanical 19 or hydraulic, is in turn connected to and controlled by an electronic control system 27 of the disc brake 1, connected with a user interface 39, e.g., a brake pedal, brake lever, or brake button, and configured for selective and independent actuation of the first piston 15 and the second piston 16.

A front portion 23 of the first piston 15 is connected to a support plate 24 of the first friction pad 12, e.g., by gluing or by means of an adhesive film or by snap coupling, or screwing.

A front portion 25 of the second piston 16 is positioned relative to the first friction pad 12 so that it can push against the support plate 24 of the first friction pad 12 in free contact, but also detach without resistance from the support plate 24. The free contact and detachment between the second piston 16 and the first friction pad 12 do not exclude the possible presence of intermediate accessory elements, e.g., an elastic spring interposed between them, but preferably occur without any interposed accessory element (connector or guide or elastic element).

Figure 3:
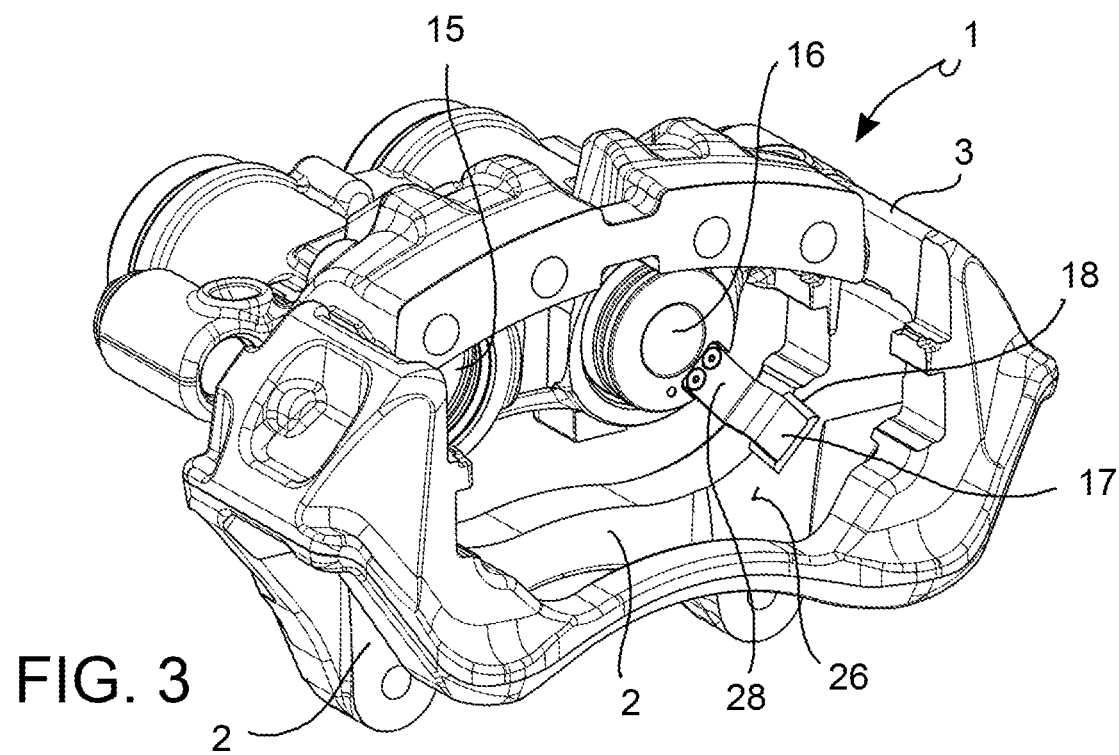
FIG. 3 is a perspective view of a first wall of a floating caliper of the brake disc in FIG. 1.
Figure 4:
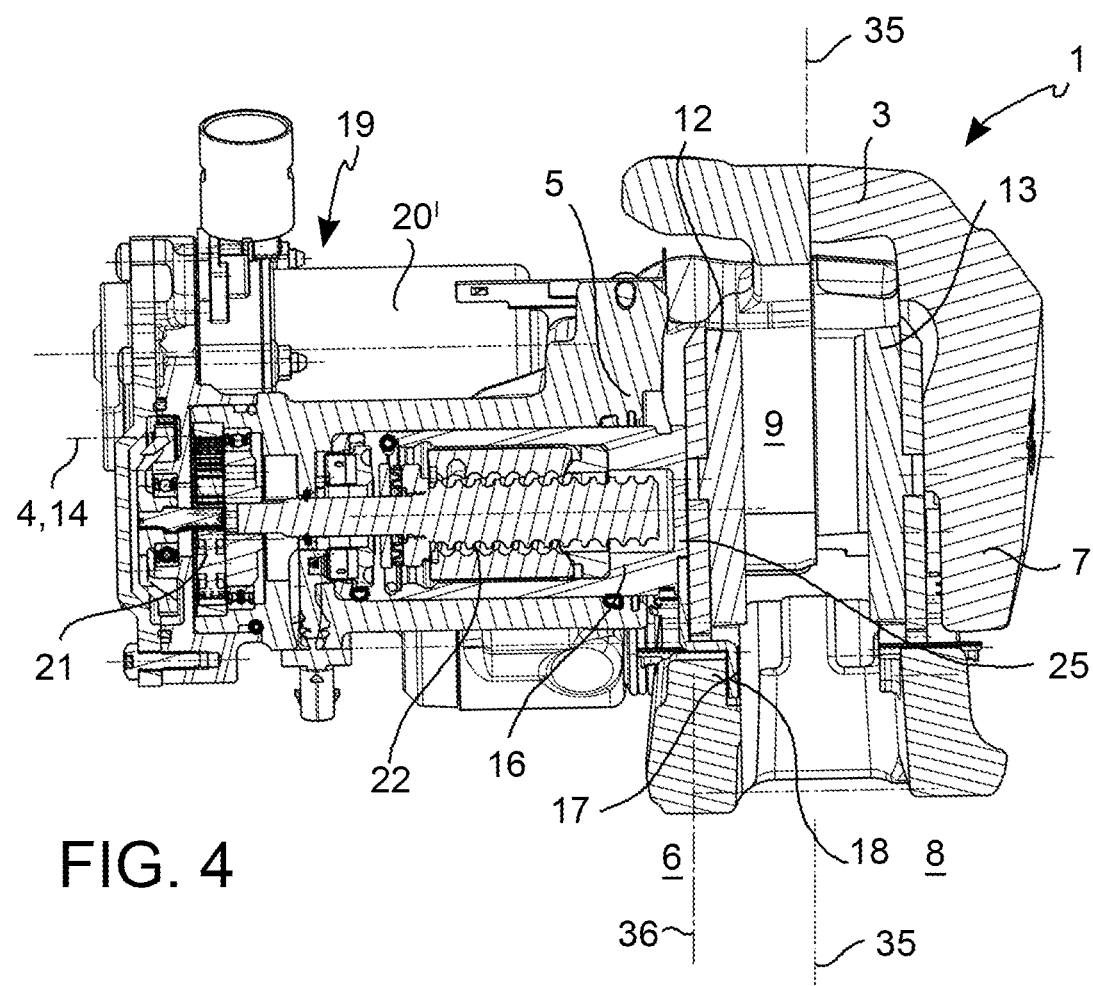
FIG. 4 is a section view of the disc brake in FIG. 1 and with the brake disc removed.
Figure 5:
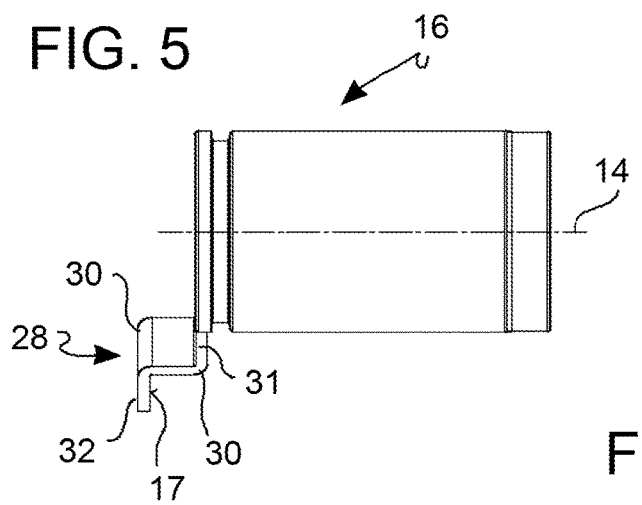
FIGS. 5 and 6 are perspective views of an actuating piston of the disc brake according to an embodiment.
Figure 6:
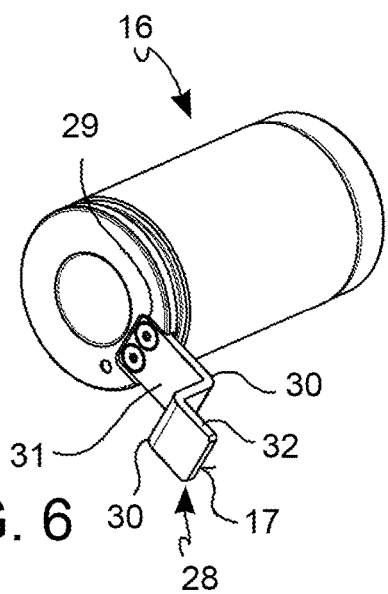
Figure 7:
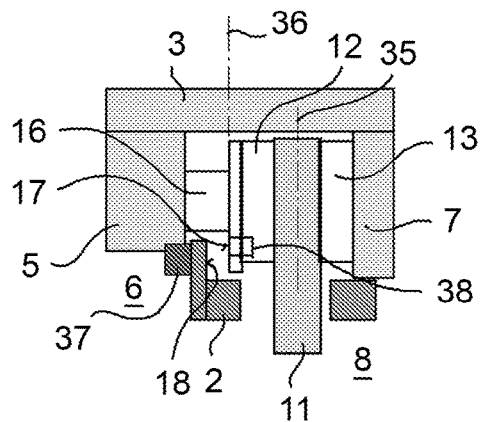
FIGS. 7 and 8 are diagrammatic block views of a disc brake pad according to an embodiment, FIGS. 9A, . . . , 9D illustrate an operating sequence of a disc brake with a floating caliper, aimed at a detachment on both sides of the pads from the brake disc, according to an embodiment, FIGS. 10A, . . . , 10D illustrate an operating sequence of a disc brake with a floating caliper, aimed at a detachment on both sides of the pads from the brake disc, according to a further embodiment, FIGS. 11A, . . . , 11E illustrate an operating sequence of a disc brake with a floating caliper, aimed at a detachment on both sides of the pads from the brake disc, according to a further embodiment.
Figure 8:
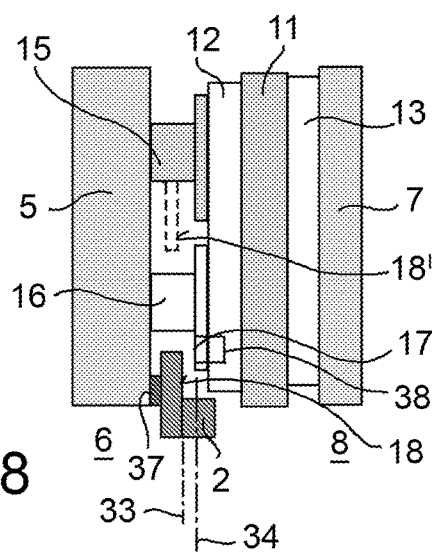

According to an embodiment, the positioning surface 17 may be formed by a positioning appendix 28 extended from the front portion 25 of the second piston 16, in a transverse direction relative to the actuating direction 14, e.g., a metal plate screwed (in a cavity 29) to the front portion 25 (FIGS. 3, 5, 6).

The resting surface 18 may be formed directly to the supporting bracket 2, e.g., to an inner surface 26 of the supporting bracket 2 arranged on the first side 6 of the caliper body 3 relatively to the position of the brake disc 11 and facing towards the second side 8.

To avoid shape adaptations of the supporting bracket 2 and to compensate for the distance between the first wall 5 and the supporting bracket 2, as well as to avoid space breaches between the positioning appendix 28 and the first friction pad 12, the positioning appendix 28 advantageously has a double fold 30 forming a step in the actuating direction 14 between a first portion 31 adjacent to the second piston 16 and a second portion 32 forming the positioning surface 17.

Advantageously, the resting surface 18 is formed in a cavity (FIG. 3) in the inner surface 26 of the supporting bracket 2, so that the resting surface 18 can be made in the precise position required, without having to make the entire inner surface 26 with the same precision.

According to an alternative embodiment, the resting surface 18' may be made in the first piston 15 or in a supporting appendix extending from the front portion 23 of the first piston 15, in a transverse direction relative to the actuating direction 14, e.g., a metal plate screwed (in a cavity) to the front portion 23, similar to the embodiment shown in FIG. 6.

When the second piston 16 retracts and the positioning surface 17 rests against the resting surface 18 of the supporting bracket 2, a further rearward movement of the second piston 16 relatively to the caliper body 3 makes the caliper body 3 slide together with the first piston and the first and second friction pads 12, 13 towards the second side 8 relatively to the supporting bracket 2 and relative to the brake disc 11, thereby creating a gap between the second friction pad 13 and the brake disc 11.

As the second piston 16 retracts and the positioning surface 17 rests against the resting surface 18' of the first piston 15, a further rearward movement of the second piston 16 relative to the caliper body 3 makes the caliper body 3 slide together with the second friction pad 13 towards the second side 8, relative to the whole of first piston 15 and first friction pad 12 and (due to supporting friction between the first friction pad 12 and the supporting bracket 2) also relative to the supporting bracket 2 and the brake disc 11, thereby creating a gap between the second friction pad 13 and the brake disc 11.

When the resting surface 18' is made at the first piston 15, the setting of the gap between the second friction pad 13 and the brake disc 11 automatically compensates for the gradual reduction in the thickness of the friction pads 12, 13 due to wear because the reference of the sliding of the caliper body 3 towards the second side 8 is the position of the first piston 15 which automatically advances with increasing wear of the first and second friction pads 12, 13.

When the resting surface 18 is made at the supporting bracket 2, a gradual reduction in the thickness of the friction pads 12, 13 due to wear gradually increases the distance between the (contact position 33 between the positioning surface 17 and the) resting surface 18 and the initial position 34 of the rearward movement of the first and second pistons 15, 16 at the end of the braking event. So, for the same total rearward movement length of the second piston 16, the gap between the second friction pad 13 and the brake disc 11 would be increasingly less controllable and would gradually decrease until it is zero. Furthermore, brake response times would be lengthened due to extra travel from pad wear.

Therefore, according to an embodiment, the position of the resting surface 18 is adjustable in the sliding direction 4 relative to a reference plane 35 of the supporting bracket 2, e.g., relative to the plane of the brake disc 11 (the supporting bracket 2 being stationary relative to the plane of the brake disc 11), to be able to compensate for a shift in the initial position 34 of the rearward movement of the second piston 16 due to wear of the friction pads 12, 13.

The disc brake 1 may comprise a resting adjustment device 37 configured to adjust the position of the resting surface 18 to compensate for a displacement of the initial position 34 of the second piston rearward movement 16 due to wear of the friction pads 12, 13, e.g., to maintain a substantially constant distance of the resting surface 18 from the initial position 34 of the first and second piston rearward movement 12, 13 at the end of the braking event.

The resting adjustment device 37 may be functionally connected with the actuating system 19 of the actuating pistons 15, 16 or with the first piston 15 or second piston 16, or with the electronic control system 27, and configured to adjust the position of the resting surface 18 according to a maximum advancement (braking) position of the actuating piston 15; 16 towards the second side 8.

According to an alternative embodiment, the position of the positioning surface 17 is adjustable in the actuating direction 14 relative to a reference plane 36 of the second piston 16, e.g. relative to the front end plane of the second piston 16 (the position of the front end of the second piston 16 being dependent on the state of wear of the friction pads 12, 13), to be able to compensate for a shift in the initial position 34 of the rearward movement of the second piston 16 due to wear of the friction pads 12, 13.

The disc brake 1 may comprise a position adjustment device 38 configured to adjust the position of the positioning surface 17 to compensate for a shift in the initial position 34 of the rearward movement of the second piston 16 due to wear of the friction pads 12, 13, e.g., such that the maximum distance between the resting surface 18 and the positioning surface 17 remains substantially constant at the end of braking.

The position adjustment device 38 may be functionally connected with the actuating system 19 of the actuating pistons 15, 16 or with the first piston 15 or second piston 16, or with the electronic control system 27, and configured to adjust the position of the positioning surface 17 according to a maximum advancement (braking) position of the actuating piston 15; 16 towards the second side 8.

Electronic Control System and Operating Method for the Disc Brake 1

According to a further aspect of the invention, an operating method the disc brake 1 comprises the steps of:
actuating the first piston 15 and the second piston 16 selectively and independently of each other,
after a service braking event, detaching the first friction pad 12 from the brake disc 11 by means of a rearward movement of the first piston 15 relatively to the caliper body 3 towards the first side 6 (the second piston 16 performs a similar rearward movement to allow the detachment of the first friction pad 12 from the brake disc 11), and
when the first friction pad 12 is detached from the brake disc 11, moving the caliper body 3 together with the second pad 13 towards the second side 8 and detaching the second pad 13 from the brake disc 11, performing a rearward movement of the second piston 16 towards the first side 6, with the positioning surface 17 abutting against the resting surface 18, 18'.

According to an embodiment, the method comprises the step of compensating for a displacement of the initial position 34 of the rearward movement of the second piston 16 due to wear of the friction pads 12, 13 by adjusting the position of the resting surface 18 in the sliding direction 4 relative to a reference plane 35 of the supporting bracket 2, e.g., relative to the plane of the brake disc 11.

The compensation phase may comprise:
maintaining a substantially constant distance between the resting surface 18 and the initial position 34 of the first or second piston rearward movement 15, 16 at the end of braking event, and/or
adjusting the position of the resting surface 18 according to a maximum advancement (braking) position of the actuating piston 15; 16 towards the second side 8.

According to an alternative embodiment, the method comprises the step of compensating for a displacement of the initial position 34 of the rearward movement of the second piston 16 due to wear of the friction pads 12, 13 by adjusting the position of the positioning surface 17 in the actuating direction 14 relative to a reference plane 36 of the second piston 16, e.g., relative to the front end plane of the second piston 16.

The step of compensating for wear of the friction pads 12, 13 may comprise an adjusting position of the resting surface 18 and/or the positioning surface 17 to:
maintain substantially constant maximum distance between the resting surface 18 and the positioning surface 17 at the end of braking.
adjusting the position of the positioning surface 17 according to a maximum advancement (braking) position of the actuating piston 15; 16 towards the second side 8.

Figure 9A:
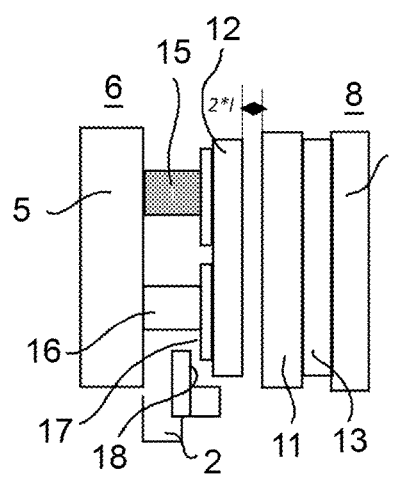

According to an embodiment (FIGS. 9A to 9D), at the end of a braking event, when the user releases the brake, e.g., by releasing the brake pedal 39:
A) the first piston 15 and the second piston 16 perform a rearward movement (towards the first side 6) by a length of 2*l, where l corresponds to the width of the planned space between the friction pads 12, 13 and the brake disc 11 (FIG. 9A),
B) the second piston 16 continues the rearward movement until the positioning surface 17 rests against the resting surface 18 (FIG. 9B),
C) after resting the positioning surface 17 against the resting surface 18, the second piston 16 continues the rearward movement by a further length l, thus making the caliper body 3 slide by the same length l towards the second side 8 to make a space of width l between the friction pads 12, 13 and the brake disc 11 on the first side 6 and the second side 8 (FIG. 9C),
D) optionally, the second piston 16 performs a forward movement (towards the second side 8) until it touches the first friction pad 12 again to be ready for the next braking event (FIG. 9D).

The contact between the second piston 16 and the first friction pad 12 may be detected by the control system 27 by detecting the stopping the forward movement of the second piston 15, or by detecting an increase in a resisting force, e.g. by detecting an increase in current drawn by the electric motor 20' of the second piston 16, or by detecting an increase in a positioning force of the first piston 15, e.g., by detecting an increase in current drawn by the electric motor 20 to actuate the first piston 15, or by detecting an increase in resisting force of the second piston 16, e.g. by detecting an increase in current drawn by the electric motor 20' to actuate the second piston 16, or by a switch responsive to the contact between the second piston 16 and the first friction pad 12.

Finally (FIG. 9D), optionally, the electric motor 20 of the first piston 15 may be actuated (forwards) to close a clearance in the electromechanical actuating system 19, in particular in the transmission mechanism 21 and/or the conversion mechanism 22, e.g., by a predetermined or appropriately detected amount of clearance.

The electronic control unit 27 is configured to automatically command the electromechanical actuating system 19 or a generic piston actuating system 15, 16 to perform the aforementioned operations of detaching the friction pads 12, 13 from the brake disc 11.

Figure 9B:
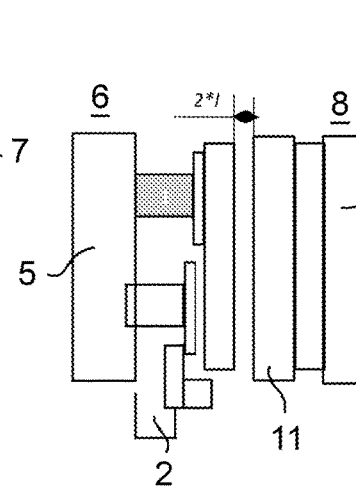
Figure 9C:
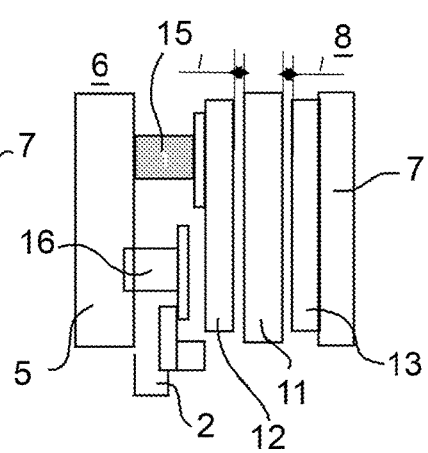
Figure 9D:
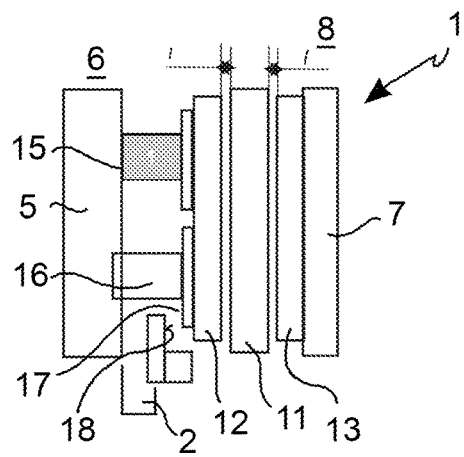

A complexity of the described pad detachment procedure lies in the step shown in FIG. 9B, where it is assumed that the limit stop position (resting position between the positioning surfaces 17 and resting surfaces 18) is known. The exact limit stop position is correlated to wear of the friction pads 12, 13, temperature (friction pad relaxation and thermal expansion of materials), and internal clearance of the actuating system 19 of the second piston 16, but in a practicable engineering approach such limit stop position may be assumed to be known based on experimental and/or measured and/or predetermined values or functions of values.

According to a further embodiment (FIGS. 10A to 10D), at the conclusion of a braking event, when the user releases the brake, e.g., by releasing the brake pedal 39:
  A) the second piston 16 performs a rearward movement until the positioning surface 17 rests against the resting surface 18 (FIG. 10A), wherein said resting is detectable (e.g., by the electronic control system 27), for example by:
    detecting an increase in current drawn by the electric motor 20' dedicated to the second piston 16, or
    detecting a stop in the movement of the second piston 16,
    a force sensor associated with the first piston 15 or the second piston 16,
    a switch responsive to the contact between the positioning surface 17 and the resting surface 18.
  B) subsequently, with the second piston 16 stationary, the first piston 15 performs a rearward movement (towards the first side 6) by a length of 2*l, where l corresponds to the planned space width between the friction pads 12, 13, and the brake disc 11 (FIG. 10B),
  C) subsequently, with the first piston 15 stationary, the second piston 16 continues the rearward movement by a further length l, thus making the caliper body 3 slide by the same length l towards the second side 8 to make a space of width l between the friction pads 12, 13 and the brake disc 11 on the first side 6 and the second side 8 (FIG. 10O),
  D) optionally, the second piston 16 performs a forward movement (towards the second side 8) until it touches the first friction pad 12 again to be ready for the next braking event (FIG. 10D).

The contact between the second piston 16 and the first friction pad 12 may be detected by the control system 27 by detecting the stopping the forward movement of the second piston 15, or by detecting an increase in a resisting force, e.g. by detecting an increase in current drawn by the electric motor 20' of the second piston 16, or by detecting an increase in a positioning force of the first piston 15, e.g., by detecting an increase in current drawn by the electric motor 20 to actuate the first piston 15, or by detecting an increase in resisting force of the second piston 16, e.g. by detecting an increase in current drawn by the electric motor 20' to actuate the second piston 16, or by a switch responsive to the contact between the second piston 16 and the first friction pad 12.

Finally (FIG. 10D), optionally, the electric motor 20 of the first piston 15 may be actuated (forwards) to close a clearance in the electromechanical actuating system 19, in particular in the transmission mechanism 21 and/or the conversion mechanism 22, e.g., by a predetermined or appropriately detected amount of clearance.

Figure 10A:
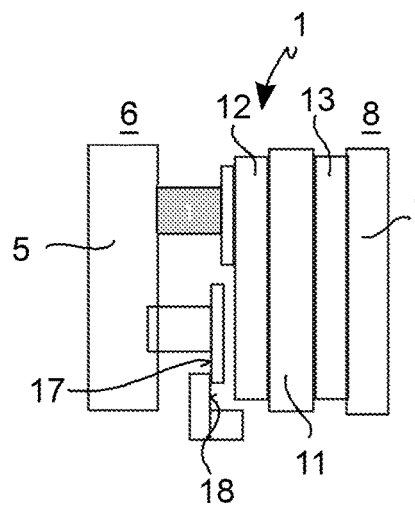
Figure 10B:
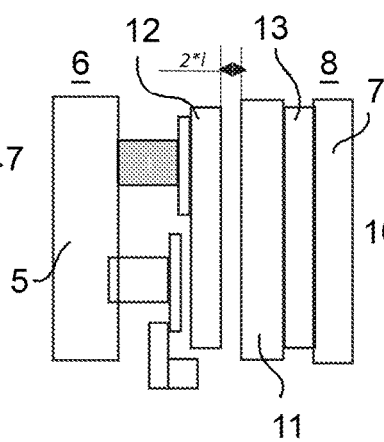
Figure 10C:
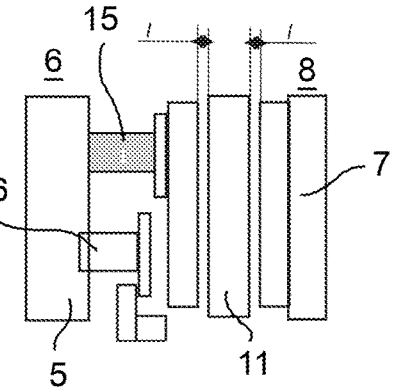
Figure 10D:
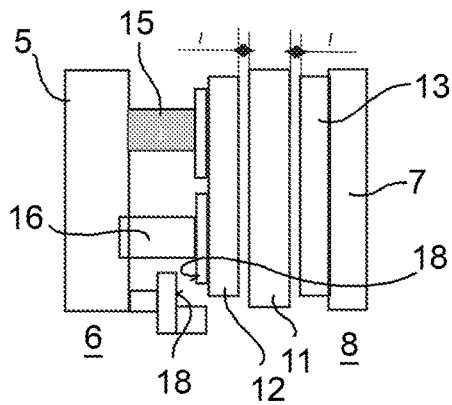

In this embodiment, it is not necessary to know the limit stop position (resting position between the positioning surface 17 and supporting surface 18), because reaching it in the step shown in FIG. 10A creates a rigid stop and cannot cause unplanned sliding of the caliper body 3 relatively to the brake disc 11.

The electronic control unit 27 is configured to automatically command the electromechanical actuating system 19 or a generic piston actuating system 15, 16 to perform the aforementioned operations of detaching the friction pads 12, 13 from the brake disc 11.

According to an embodiment (FIGS. 11A to 11E), at the end of a braking event, when the user releases the brake, e.g., by releasing the brake pedal 39:
  A) the second piston 16 performs a rearward movement until the positioning surface 17 rests against the resting surface 18 (FIG. 11A),
    wherein said resting is detectable (e.g., by the electronic control system 27), for example by:
      detecting an increase in current drawn by the electric motor 20' dedicated to the second piston 16, or
      detecting a stop in the movement of the second piston 16,
      a force sensor associated with the first piston 15 or the second piston 16,
      a switch responsive to the contact between the positioning surface 17 and the resting surface 18.
  B) subsequently, with the second piston 16 stationary, the first piston 15 performs a rearward movement (towards the first side 6) of a length X (not known precisely because of the internal clearances of the actuating system 19 recovered by the first piston 15 during its rearward movement) (FIG. 11B),
  C) subsequently, with the first piston 15 stationary, the second piston 16 continues the rearward movement, making the caliper body 3 slide towards the second side 8 until it reaches a stop position in which the first friction pad 12 abuts again against the brake disc 11 and the second friction pad 13 is detached by the same distance X from the brake disc 11 (FIG. 11C),
  The reaching the stopping position (FIG. 11C) is detectable (e.g., by the electronic control system 27), e.g., by:
    detecting an increase in current drawn by the electric motor 20' dedicated to the second piston 16, or
    detecting an increase in current drawn by the electric motor 20' dedicated to the first piston 15, or
    detecting a stop in the movement of the second piston 16,
    a force sensor associated with the first piston 15 or the second piston 16,
    a switch responsive to the contact between the positioning surface 17 and the resting surface 18.
  Since the step of sliding of the caliper body 3 (FIG. 11C) was performed by the second piston 16 without recovery of internal clearance, the distance X (previously not known precisely) is now known (to the electronic control system 27) in terms of the angular travel of the electric motor 20' associated with the second piston 16.
  Furthermore, by correlating:
    the angular travel of the electric motor 20' of the second piston 16 for sliding the caliper body 3 of the distance X with
    the angular travel of the electric motor 20 of the first piston 15 for the backward movement of the first piston 15 of distance X and with
    the transmission ratios of the actuating system 19 of the first piston 15 and the second piston 16,
    the internal clearance of the actuating system 19 of the first piston 15 is also known.
  D) subsequently, with the second piston 16 stationary, the first piston 15 performs a rearward movement towards the first side 6 by the same length X, thus also detaching the first friction pad 12 from the brake disc 11 by the same measure X (FIG. 11D).

In this case, no characterization of the free clearance of the first piston 15 is necessary since its previous movement (step in FIG. 11B) was in the same direction.

E) optionally, the second piston 16) performs a forward movement (towards the second side (8) until it touches the first friction pad 12 again to be ready for the next braking event (FIG. 11E).

Again in this case, the contact between the second piston 16 and the first friction pad 12 may be detected by the control system 27 by detecting the stopping the forward movement of the second piston 15, or by detecting an increase in a resisting force, e.g. by detecting an increase in current drawn by the electric motor 20' of the second piston 16, or by detecting an increase in a positioning force of the first piston 15, e.g. by detecting an increase in current drawn by the electric motor 20 to actuate the first piston 15.

Finally (FIG. 11E), optionally, the electric motor 20 of the first piston 15 may be actuated (forwards) to close a clearance in the electromechanical actuating system 19, in particular in the transmission mechanism 21 and/or the conversion mechanism 22.

In this case, the amount of internal clearance of the first piston 15 is known because it was previously determined.

In this embodiment, it is not necessary to know or determine the inner clearances of the piston actuating system in advance. Instead, it is necessary to perform a greater number of adjustment steps involving the contact between pad and disc, in turn creating transient drag torques.

The electronic control unit 27 is configured to automatically command the electromechanical actuating system 19 or a generic piston actuating system 15, 16 to perform the aforementioned operations of detaching the friction pads 12, 13 from the brake disc 11.

To set the desired distance accurately between the friction pads and the brake disc, the electronic control system 27 may be configured to (or the method may comprise the step of) determining or detecting the clearance magnitude in the actuating direction 14 (of the actuating system 19 selectively) for the first piston 15 and the second piston 16. If the movement of the piston 15; 16 requires clearance recovery, the electric motor 20; 20' dedicated to the movement of the concerned piston 15; 16 is actuated depending on the clearance magnitude and the planned travel of the piston 15; 16. In other words, the motor is driven for a total travel which is the sum of the planned travel and the clearance magnitude.

The clearance magnitude can be detected indirectly by detecting the magnitudes at the electric motor 20, 20', for example:
- the angle of rotation of the electric motor rotor 20, 20' using a Hall sensor or encoder, or angular position sensors, or
- electrical magnitudes of the motor 20, 20', e.g., current consumption,
- and their correlation to the clearance magnitude, or through a position sensor.

Obviously, a person skilled in art may make further changes and variants to the disc brake 1 and the method according to the invention, all without departing from the scope of protection of the invention, as defined in the following claims.

What is claimed is:

1. A disc brake of the floating caliper type, comprising:
a supporting bracket connectable to a vehicle suspension,
a caliper body slidingly connected to the supporting bracket in a sliding direction and forming a first wall arranged on a first side of the caliper body and a second wall arranged on a second side of the caliper body opposite to the first side in the sliding direction,
the first and second walls mutually delimiting a disc space for accommodating a portion of a braking band of a brake disc,
a first friction pad supported in the disc space on the first side of the caliper body, sliding relative to the caliper body,
a second friction pad supported in the disc space on the second side of the caliper body and fixed to the second wall of the caliper body,
a plurality of actuating pistons supported in the first wall of the caliper body which can be operated to push the first friction pad, in an actuating direction parallel to the sliding direction, towards the second side against the brake disc, causing the first friction pad to move towards the second friction pad and sliding of the caliper body relative to the supporting bracket until the brake disc is tightened on both sides between the first and second friction pads,
wherein:
the plurality of actuating pistons comprises a first piston connected to the first friction pad integral in translation in the actuating direction and a second piston associated with the first friction pad in a freely resting and detachable manner along the actuating direction,
the second piston forms a positioning surface which can abut, in the sliding direction towards the first side, against a corresponding resting surface which is either fixed or integral in translation in a direction of travel, either with the supporting bracket or with the first piston,
the first piston and the second piston can be actuated selectively and independently of each other so that:
a rearward movement of the first piston towards the first side detaches the first friction pad from the brake disc-, and
a rearward movement of the second piston towards the first side, with the positioning surface abutting against the resting surface, moves the caliper body together with the second friction pad towards the second side and detaches the second friction pad from the brake disc.

2. The disc brake of claim 1, wherein the actuating pistons can be actuated by an electro-mechanical actuating system, comprising for each piston a dedicated electric motor and a mechanism for motion transmission and conversion, said electro-mechanical actuating system being connected to and controlled by an electronic control system of the disc brake.

3. The disc brake of claim 1, wherein the positioning surface comprises a positioning appendix extended from a front portion of the second piston, crosswise relating to the actuating direction.

4. The disc brake of claim 1, wherein the resting surface is formed at an inner surface of the supporting bracket arranged on the first side relative to a position of the brake disc and facing towards the second side.

5. The disc brake of claim 1, wherein a position of the resting surface is adjustable in the sliding direction relative to a reference plane of the supporting bracket to compensate for a displacement of an initial position of a rearward movement of the second piston due to wear of the friction pads.

6. The disc brake of claim 5, further comprising a resting adjustment device configured to adjust the position of the resting surface to maintain substantially constant a distance of the resting surface from the initial position of the rearward movement of the second piston at the end of a braking event.

7. The disc brake of claim 6, wherein the resting adjustment device is functionally connected with the electromechanical actuating system and configured to adjust the position of the resting surface according to a maximum advanced braking position of the actuating pistons towards the second side.

8. The disc brake of claim 1, wherein, at the end of a braking event, when a user releases the brake:
   A) the first piston and the second piston perform a rearward movement towards the first side by a length of 2*l, where l corresponds to a planned space width between the friction pads and the brake disc,
   B) the second piston continues the rearward movement until the positioning surface rests against the resting surface,
   C) after resting of the positioning surface against the resting surface, the second piston continues the rearward movement by a further length l, thus making the caliper body slide the same length l towards the second side to make a space of width l between the friction pads and the brake disc on the first side and on the second side,
   D) the second piston performs a forward movement towards the second side until the second piston touches the first friction pad again to be ready for the next braking event.

9. The disc brake of claim 1, wherein, at the end of a braking event, when a user releases the brake:
   A) the second piston performs a rearward movement until the positioning surface rests against the resting surface,
   B) subsequently, with the second piston stationary, the first piston performs a rearward movement towards the first side by a length of 2*l, where l corresponds to a planned space width between the friction pads and the brake disc,
   C) subsequently, with the first piston stationary, the second piston continues the rearward movement by a further length l, thus making the caliper body slide the same length l towards the second side to make a space of width l between the friction pads and the brake disc on the first side and on the second side,
   D) the second piston performs a forward movement towards the second side until the second piston touches the first friction pad again to be ready for the next braking event.

10. The disc brake of claim 8, wherein after step D) an electric motor of the first piston is actuated forwards to close a clearance in an electromechanical actuating system of the first piston.

11. The disc brake of claim 1, wherein, at the end of a braking event, when a user releases the brake:
   A) the second piston performs a rearward movement until the positioning surface rests against the resting surface,
   B) subsequently, with the second piston stationary, the first piston performs a rearward movement towards the first side by a length X,
   C) subsequently, with the first piston stationary, the second piston continues the rearward movement, making the caliper body slide towards the second side until it reaches a stop position in which the first friction pad abuts again against the brake disc and the second friction pad is detached by the same distance X from the brake disc,
   D) subsequently, with the second piston stationary, the first piston performs a rearward movement towards the first side by the same length X, thus also detaching the first friction pad from the brake disc by the same measure X,
   E) the second piston performs a forward movement towards the second side until the second piston touches the first friction pad again to be ready for the next braking event.

12. An operating method of a disc brake of the floating caliper type, comprising:
   a supporting bracket connectable to a vehicle suspension,
   a caliper body slidingly connected to the supporting bracket in a sliding direction and forming a first wall arranged on a first side of the caliper body and a second wall arranged on a second side of the caliper body opposite to the first side in the sliding direction,
   the first and second walls mutually delimiting a disc space for accommodating a portion of a braking band of a brake disc,
   a first friction pad supported in the disc space on the first side of the caliper body, sliding relative to the caliper body,
   a second friction pad supported in the disc space on the second side of the caliper body and fixed to the second wall of the caliper body,
   a plurality of actuating pistons supported in the first wall of the caliper body which can be operated to push the first friction pad, in an actuating direction parallel to the sliding direction, towards the second side against the brake disc, causing the first friction pad to move towards the second friction pad and sliding of the caliper body relative to the supporting bracket until the brake disc is tightened on both sides between the first and second friction pads,
   wherein:
   the plurality of actuating pistons comprises a first piston connected to the first friction pad integral in translation in the actuating direction and a second piston associated with the first friction pad in a freely resting and detachable manner along the actuating direction,
   the second piston forms a positioning surface which can abut, in the sliding direction towards the first side, against a corresponding resting surface which is either fixed or integral in translation in a direction of travel, either with the supporting bracket or with the first piston,
   the first piston and the second piston can be actuated selectively and independently of each other so that:
   a rearward movement of the first piston towards the first side detaches the first friction pad from the brake disc, and
   a rearward movement of the second piston towards the first side, with the positioning surface abutting against the resting surface, moves the caliper body together with the second friction pad towards the second side and detaches the second friction pad from the brake disc,
   the method comprising the steps of:
   actuating the first piston and the second piston selectively and independently of each other,
   after a service braking event, detaching the first friction pad from the brake disc by a rearward movement of the first piston relative to the caliper body towards the first side, and
   when the first friction pad is detached from the brake disc, moving the caliper body together with the second friction pad towards the second side and detaching the second friction pad from the brake disc, performing a rearward movement of the second piston towards the first side, with the positioning surface abutting against the resting surface.

* * * * *